US009160163B2

United States Patent
Fink

(10) Patent No.: US 9,160,163 B2
(45) Date of Patent: Oct. 13, 2015

(54) BATTERY MANAGEMENT SYSTEM, MOTOR VEHICLE AND BATTERY SYSTEM

(71) Applicants: Robert Bosch GmbH, Stuttgart (DE); Samsung SDI Co., Ltd., Yongin-si, Gyeonggi-do (KR)

(72) Inventor: Holger Fink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 13/953,821

(22) Filed: Jul. 30, 2013

(65) Prior Publication Data

US 2014/0036394 A1  Feb. 6, 2014

(30) Foreign Application Priority Data

Jul. 31, 2012 (DE) .......................... 10 2012 213 422

(51) Int. Cl.
*B60L 3/04* (2006.01)
*H02H 7/18* (2006.01)
*H01M 10/42* (2006.01)
*H01M 10/44* (2006.01)
*B60L 3/00* (2006.01)

(52) U.S. Cl.
CPC ................ *H02H 7/18* (2013.01); *B60L 3/0046* (2013.01); *B60L 3/04* (2013.01); *H01M 10/425* (2013.01); *H01M 10/44* (2013.01); *H01M 2200/00* (2013.01); *H01M 2220/20* (2013.01)

(58) Field of Classification Search
CPC ..................................................... B60L 3/04
USPC ............ 361/13; 320/134, 136, 137, 126, 127; 429/61, 439, 67
See application file for complete search history.

(56) References Cited

U.S. PATENT DOCUMENTS

| | | | | |
|---|---|---|---|---|
| 5,369,540 A | * | 11/1994 | Konrad et al. | 361/6 |
| 5,939,217 A | | 8/1999 | Tamura et al. | |
| 7,304,255 B1 | * | 12/2007 | Pratt | 200/51 R |
| 8,687,338 B2 | * | 4/2014 | Odaohhara | 361/104 |
| 2005/0012395 A1 | * | 1/2005 | Eckroad et al. | 307/44 |
| 2005/0221164 A1 | * | 10/2005 | Kawazu et al. | 429/61 |
| 2008/0061764 A1 | * | 3/2008 | Tae et al. | 324/72 |
| 2009/0206679 A1 | * | 8/2009 | King et al. | 307/125 |
| 2009/0295329 A1 | * | 12/2009 | Yugou | 320/116 |
| 2011/0129705 A1 | * | 6/2011 | Lee | 429/90 |

(Continued)

FOREIGN PATENT DOCUMENTS

| | | |
|---|---|---|
| CN | 1240057 A | 12/1999 |
| CN | 101079542 A | 11/2007 |

(Continued)

*Primary Examiner* — Thienvu Tran
*Assistant Examiner* — Angela Brooks
(74) *Attorney, Agent, or Firm* — Maginot, Moore & Beck LLP

(57) ABSTRACT

The present disclosure relates to a battery management system for at least one battery cell, for example a lithium-ion battery cell, and to a motor vehicle and to a battery system. A battery management system for at least one battery cell is configured in such a way that, in reaction to a triggering signal, said battery management system can make available a current path between poles of the at least one battery cell. In this context, the current path is configured in such a way that by making available the current path a light arc in a fuse of the at least one battery cell after the triggering of the fuse is prevented or ended. This increases the protection against hazards which can arise from a battery cell in hazardous situations for a vehicle.

4 Claims, 2 Drawing Sheets

(56) References Cited

U.S. PATENT DOCUMENTS

| | | | |
|---|---|---|---|
| 2011/0133912 A1* | 6/2011 | Tesman | 340/426.12 |
| 2012/0034501 A1* | 2/2012 | Hermann et al. | 429/62 |
| 2012/0105015 A1* | 5/2012 | Hermann et al. | 320/164 |
| 2012/0225328 A1* | 9/2012 | Nakanouchi et al. | 429/7 |
| 2013/0149572 A1* | 6/2013 | Matsuo et al. | 429/61 |
| 2013/0169038 A1* | 7/2013 | King | 307/10.1 |
| 2013/0179012 A1* | 7/2013 | Hermann et al. | 701/22 |
| 2014/0001844 A1* | 1/2014 | Krieg | 307/10.7 |
| 2014/0065467 A1* | 3/2014 | Choi et al. | 429/158 |
| 2014/0322569 A1* | 10/2014 | Wipfler et al. | 429/61 |
| 2015/0000991 A1* | 1/2015 | Lim et al. | 180/65.31 |

FOREIGN PATENT DOCUMENTS

| | | |
|---|---|---|
| DE | 10 2009 000 682 A1 | 8/2010 |
| WO | 93/10589 A1 | 5/1993 |

\* cited by examiner

BATTERY MANAGEMENT SYSTEM, MOTOR VEHICLE AND BATTERY SYSTEM

This application claims priority under 35 U.S.C. §119 to patent application no. DE 10 2012 213 422.0, filed on Jul. 31, 2012 in Germany, the disclosure of which is incorporated herein by reference in its entirety.

The present disclosure relates to a battery management system for a battery cell, for example a lithium-ion battery cell. In addition, the present disclosure relates to a motor vehicle.

BACKGROUND

Battery cells, for example lithium-ion battery cells, can be found, for example, in battery systems of motor vehicles, for example electric motor vehicles or hybrid motor vehicles in conjunction with drives of the motor vehicles.

Battery systems for use in the drive train of motor vehicles are also referred to as traction batteries. Such battery systems can be embodied as systems composed of battery cells and battery management system. In order to provide the power output which is required in hybrid vehicles and electric vehicles, battery cells, the elementary voltage sources, are connected in series and partially also in parallel. In the case of electric vehicles, battery systems have in some cases voltages above 450 V, and even in the case of hybrid vehicles the voltage of 60 V, which is assumed as a safety threshold for contact with people, is exceeded. If such battery systems are short-circuited as a result of external events, such as accidents or a malfunction in the actuation of a power switch, currents, with current strengths which may cause the battery to burst or to catch fire, may be produced in the battery cells.

FIG. 1 shows a basic circuit diagram of a traction battery 5 according to the prior art, such a traction battery 5 being known, for example, from laid-open patent application DE 10 2009 000 682. FIG. 1 shows two poles 10 and 20 which are electrically connected via a current path 30 on which battery cells 15, as voltage sources, are arranged in series, with the result that a voltage which is made available cumulatively by the cells 15 can be tapped via the poles. In addition, the module has a charging and disconnecting device 40 at the positive pole 10, a disconnecting device 50 at the negative pole 20 and a service plug 60.

FIG. 2 shows a basic circuit diagram of a battery cell 15 according to the prior art, such a battery cell 15 being known, for example, from U.S. Pat. No. 5,939,217. Said figure shows two poles 100 and 200 via which the voltage which is made available by means of the cell 15 can be tapped from a voltage source 300. In addition, the cell has a fuse 400 at the positive pole 100. The fuse 400 has the function of reliably disconnecting the voltage source 300 from the positive pole 100 in the case of an abnormal state of the temperature or current flow in the battery cell 15.

International Patent Application WO1993010589 discloses a device for balancing out the charge states of subunits of a battery. Each subunit is provided with a discharge circuit with resistors and fuses connected in series. The discharge circuit can be switched.

SUMMARY

According to the disclosure, a battery management system is made available for at least one battery cell, wherein the battery management system is configured in such a way that, in reaction to a triggering signal, said battery management system can make available a current path between poles of the at least one battery cell. According to the disclosure, the current path is configured in such a way that by making available the current path a light arc in a fuse of the at least one battery cell after the triggering of the fuse is prevented or ended.

This increases the protection against hazards which can arise from a battery cell in hazardous situations for a vehicle.

In fact, it has been discovered that in battery cells with an integrated fuse, light arcs can be formed after the triggering of the fuse, for example as a result of accidents.

In a first advantageous embodiment, the current path is configured in such a way that when the current path is made available, triggering of the at least one fuse is brought about. This permits controlled triggering of the fuse.

In one variant, the battery management system according to the first advantageous exemplary embodiment comprises a device for receiving the triggering signal.

This permits use in a motor vehicle together with a device for making available the triggering signal in reaction to the detection of a hazardous situation for a motor vehicle, wherein the device for receiving the triggering signal is connected to the device for making available the triggering signal. In this way it is possible to prevent a traction battery system of a hybrid vehicle or electric vehicle from fire or bursting owing to a hazardous situation for a motor vehicle.

Furthermore, a motor vehicle and a battery system are disclosed herein.

BRIEF DESCRIPTION OF THE DRAWINGS

Exemplary embodiments are explained in more detail with reference to the drawings and the following description. In the drawings.

DETAILED DESCRIPTION

Figure 1:
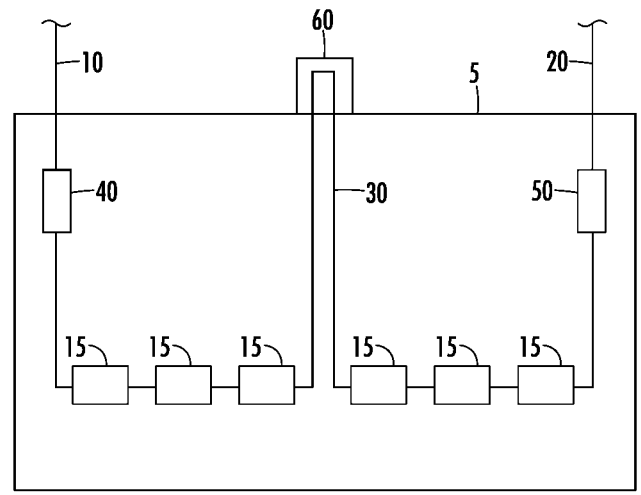
FIG. 1 shows a basic circuit diagram of a battery system according to the prior art.
Figure 2:
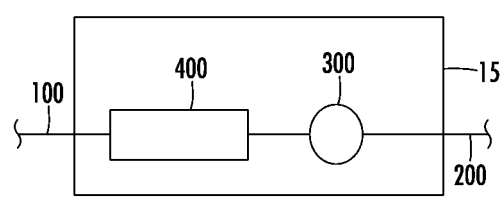
FIG. 2 shows a basic circuit diagram of a battery cell according to the prior art.
Figure 3:
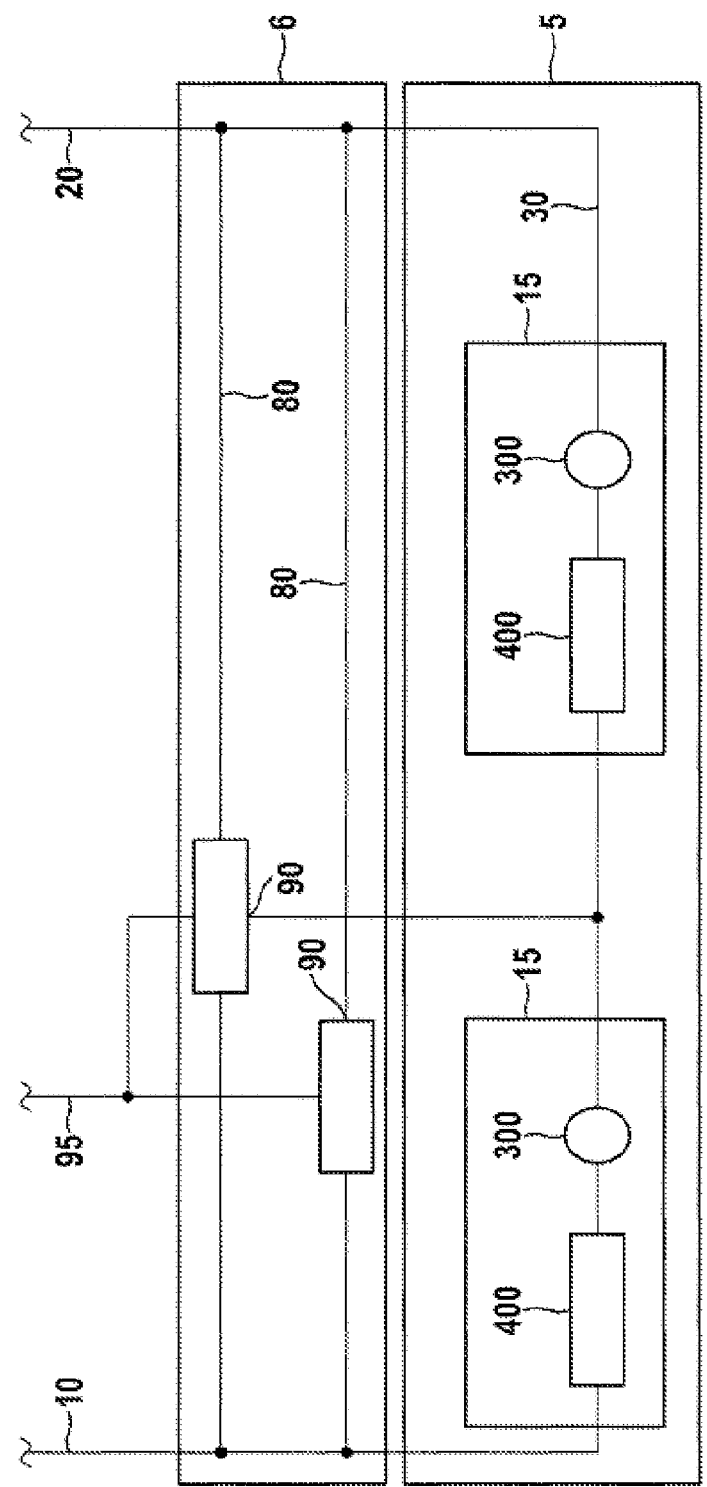
FIG. 3 shows a basic circuit diagram of a first exemplary embodiment of the disclosure.

FIG. 3 shows a basic circuit diagram of a first exemplary embodiment of the disclosure. It shows a battery system 5, for example a battery module, with two poles 10 and 20 which are electrically connected via a current path 30 on which battery cells 15 with voltage sources 300 and fuses 400 are arranged in series, with the result that a voltage which is made available by the cells 15 can be tapped via the poles 10, 20 of the module 5. FIG. 3 also shows, for each battery cell 15, a second, parallel current path 80 via which the poles 10 and 20 of the battery cell can be electrically connected. In the exemplary embodiment shown, the second current path 80 can be made available by closing a switch 90. The battery management system 6 has here a device 95 which is embodied, for example, as an input and has the purpose of receiving a triggering signal which causes the switch 90 to close.

The second current path 80 has low impedance here, that is to say is embodied with a low electrical resistance value, which permits controlled short-circuiting of the module 5. Closing of the second current path 80 generates currents in the cells 15, which currents cause at least one of the fuses 400 to trigger, and as a result cause the current path 30 to be disconnected.

However, the currents generated by the closing of the second current path 80 are not so high that this could result in light arcs in triggered fuses 400 or light arcs which are already present before the closing of the second current path 80 continuing to be present.

The battery system according to the first exemplary embodiment is suitable for use in a motor vehicle in conjunction with a system for detecting hazardous situations for a motor vehicle, for example a crash sensor. After a hazardous situation, for example an accident, is detected, the crash sensor transmits a triggering signal to the battery system or the battery management system which, in reaction to the reception of the triggering signal, closes the second current path and thereby brings about controlled short-circuiting of the cells which are combined in the battery.

What is claimed is:

1. A battery management system for at least one battery cell comprising:
  a fuse arranged in series with the at least one battery cell along a first current path between poles of the at least one battery cell;
  a second current path between the poles of the at least one battery cell and connected to the first current path; and
  a switching device configured to open and close the second current path,
  wherein the battery management system is configured to cause the switching device to close the second current path between the poles of the at least one battery cell in response to receiving a triggering signal, and
  wherein the second current path is configured such that the closing of the second current path prevents a light arc in the fuse of the at least one battery cell after the fuse is triggered.

2. The battery management system according to claim 1, further comprising: a receiving device configured to receive the triggering signal.

3. A motor vehicle comprising:
  at least one battery cell; and
  a battery management system including (i) a fuse arranged in series with the at least one battery cell along a first current path between poles of the at least one battery cell, (ii) a second current path between the poles of the at least one battery cell and connected to the first current path, and (iii) a receiving device configured to receive a triggering signal; and
  a triggering device configured to generate the triggering signal in response to detection of a hazardous situation for the motor vehicle,
  wherein the receiving device is connected to the triggering device,
  wherein the battery management system is configured to cause the switching device to close the second current path between the poles of the at least one battery cell in response to the receiving device receiving the triggering signal from the triggering device, and
  wherein the second current path is configured such that the closing of the second current path causes a current to flow in the first current path that is sufficient to trigger the fuse to open the first current path without causing a light arc in the fuse of the at least one battery cell after the fuse is triggered.

4. A battery system comprising:
  at least one battery cell; and
  a battery management system including a fuse arranged in series with the at least one battery cell along a first current path between poles of the at least one battery cell, a second current path between the poles of the at least one battery cell that is connected to the first current path, and a switching device configured to open and close the second current path,
  wherein the battery management system is configured to cause the switching device to close the second current path between the poles of the at least one battery cell in response to receiving a triggering signal, and
  wherein the second current path is configured such that the closing of the second current path causes a current to flow in the first current path that is sufficient to trigger the fuse to open the first current path without causing a light arc in the fuse of the at least one battery cell after the fuse is triggered.

* * * * *